United States Patent [19]

Mayer

[11] 4,312,658
[45] Jan. 26, 1982

[54] METHOD OF AND APPARATUS FOR CONTROLLING BATCH THICKNESS AND GLASS LEVEL IN A GLASS FURNACE

[75] Inventor: James R. Mayer, Huntingdon, Pa.

[73] Assignee: Owens-Corning Fiberglas Corporation, Toledo, Ohio

[21] Appl. No.: 216,701

[22] Filed: Dec. 15, 1980

[51] Int. Cl.³ .............................................. C03B 3/00
[52] U.S. Cl. ......................................... 65/29; 65/134; 65/136; 65/160; 65/162; 65/335
[58] Field of Search .................. 65/29, 134, 136, 160, 65/162, 335

[56] References Cited

U.S. PATENT DOCUMENTS

| | | | |
|---|---|---|---|
| 2,262,070 | 11/1941 | Turk | 65/160 X |
| 4,002,448 | 1/1977 | Griffith et al. | 65/29 |
| 4,194,077 | 3/1980 | Canfield et al. | 65/335 X |

Primary Examiner—Arthur D. Kellogg
Attorney, Agent, or Firm—Ronald C. Hudgens; Patrick P. Pacella; Paul T. Kashimba

[57] ABSTRACT

A method of and apparatus for controlling the thickness of a blanket of batch floating on a body of molten glass in a glass melting furnace comprising feeding batch to the surface of the blanket of batch, sensing the radiation reflected from a sidewall of the furnace above the blanket of batch and controlling the feed rate of the batch in response to the sensed radiation to maintain the blanket of batch at a predetermined thickness.

19 Claims, 2 Drawing Figures

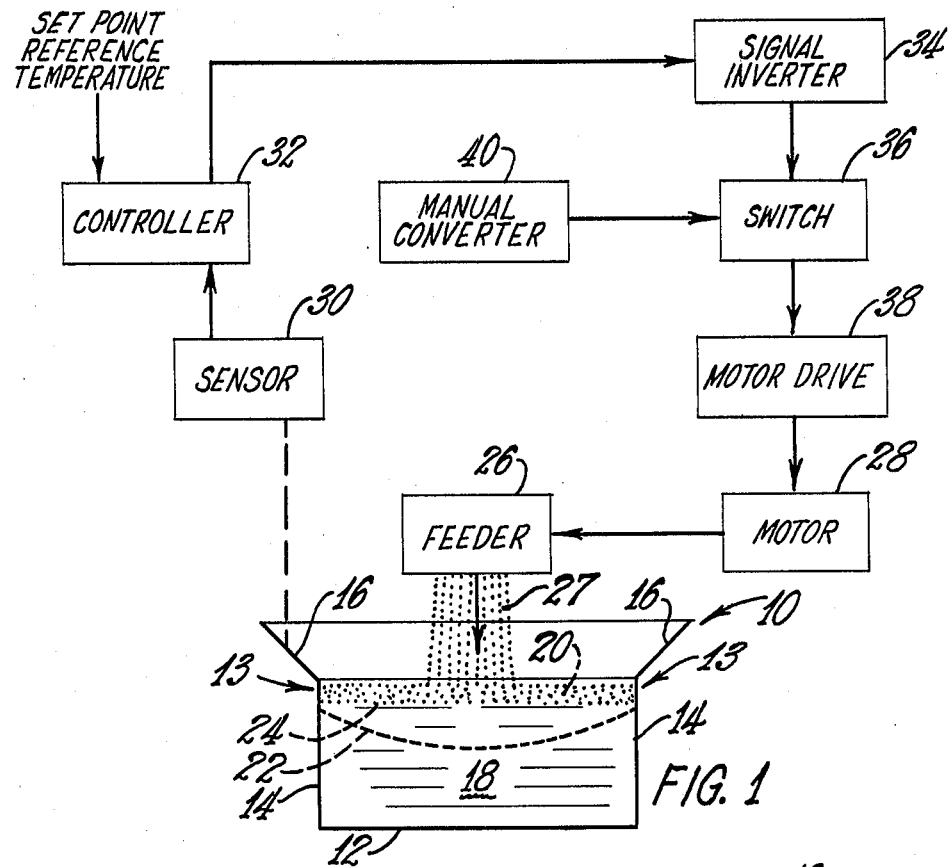
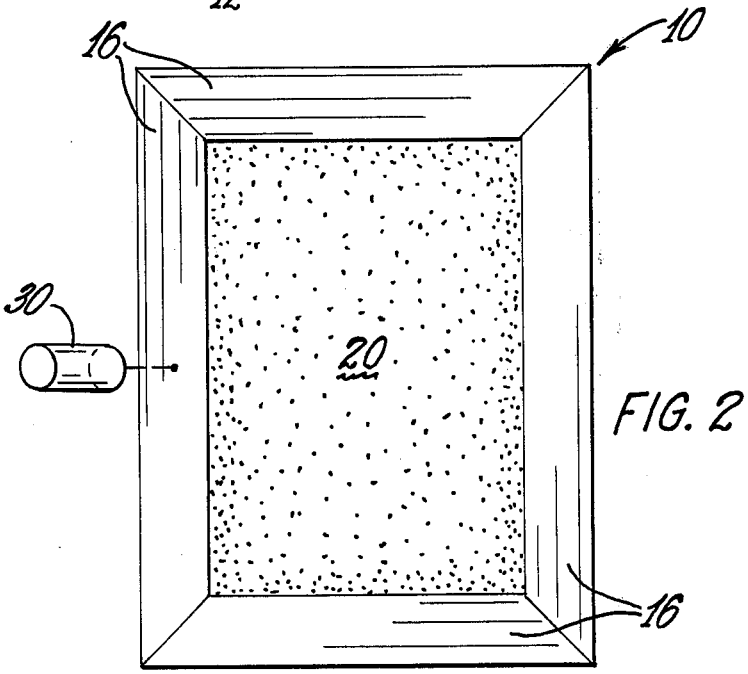

METHOD OF AND APPARATUS FOR CONTROLLING BATCH THICKNESS AND GLASS LEVEL IN A GLASS FURNACE

BACKGROUND OF THE INVENTION

This invention relates to the production of glass fibers, e.g., fibers made by melting particulate batch ingredients or minerals, including basalt and the like, and, more particularly, to a method of and apparatus for controlling the thickness of a blanket of batch floating on a body of molten glas in a glass melting furnace and for controlling the level of molten glass in such furnace.

Electric glass melting furnaces have a plurality of submerged electrodes that are positioned in the furnace in a predetermined pattern. An electric current is caused to flow through the molten glass between the electrodes to heat the glass by the Joule effect. Glass batch material is supplied to the top surface of the molten glass to provide both a source of supply and an insulating layer or blanket. The amount of batch supplied to the furnace must be carefully controlled to insure that a blanket of predetermined thickness is maintained over the entire top of the furnace. This blanket of batch reduces heat loss from the furnace and also protects the feeder from excessive heat, since the amount of heat lost is inversely proportional to the thickness of the batch. A constant batch thickness increases the life of the furnace by reducing the stress and warpage of the furnace that are caused by temperature fluctuations.

Maintaining a constant level of molten glass in the furnace is also important, since a constant glass level reduces the erosion of the refractory and thus extends the life of the furnace. In addition, it provides a constant head pressure and a uniform glass temperature, resulting from a uniform dwell time in the furnace; both of which assist in the production of fibers of uniform diameter. Still further, a constant glass level ensures that the glass level will not drop below the level of the heating element in furnaces that do not have bottom entering heating elements.

The prior art has attempted to control the thickness of the blanket of batch by remotely sensing the temperature of the surface of the batch, such as by using an infrared sensor. However, it has been found that outgassing, which causes eruptions in the surface of the batch cover at or near the area that the infrared sensor is monitoring, causes the thickness of the batch cover to drift from the desired set point. This drifting problem is intensified when only a thin blanket of batch, such as $\frac{3}{8}$ to 1 inch (0.95 to 2.54 centimeters), is maintained on the surface of the molten glass. Moreover, the prior art has not provided a method of controlling the level of molten glass in a furnace at a predetermined level. Rather, the prior art has allowed the level to vary, thereby affecting the quality of the fibers produced and shortening the useful life of the furnace.

Therefore, it is an object of this invention to provide a reliable and accurate method of and apparatus for controlling the thickness of a blanket of batch material floating on a body of molten glass in a glass melting furnace. It is an additional object of the present invention to provide a method of precisely maintaining the level of the molten glass at a predetermined level.

SUMMARY OF THE INVENTION

In accordance with the present invention, there is provided a method of controlling the thickness of a blanket of batch floating on a body of molten glass in a glass melting furnace. The method comprises the steps of feeding batch to the surface of the blanket of batch, sensing the radiation reflected from a sidewall of the furnace above the blanket of batch, and controlling the feed rate of the batch in response to the sensed temperature to maintain the blanket of batch at a predetermined thickness.

In addition, the present invention provides an apparatus for controlling the thickness of a blanket of batch floating on a body of molten glass in a glass melting furnace having a sidewall and a feeder means for supplying batch to the furnace such that the batch is supplied above the body of molten glass. The subject apparatus comprises means for sensing the radiation reflected from the sidewall above the blanket of batch and means for controlling the batch feed rate of the feeder means in response to the temperature sensed by the sensing means to maintain the blanket of batch at a predetermined thickness.

Still further, the present invention provides a method of controlling the level of molten glass in a glass melting furnace. The method comprises the steps of: establishing a predetermined level of molten glass in the furnace; feeding batch to the surface of the molten glass to create a blanket of batch on the surface; sensing the radiation reflected from a sidewall of the furnace above the blanket of batch; and controlling the batch feed rate in response to the sensed radiation to maintain the molten glass at the predetermined level.

The sensor is positioned such that it detects the radiation reflected from the sidewall of the furnace above the upper surface of the batch material; this sidewall may be either perpendicular to the bottom of the furnace or slanted. Preferably, the sensor is an infrared sensor that remotely detects the reflected radiation. It has been found that this reflected radiation is indicative of the average temperature of the surface of the batch layer, thereby overcoming the shortcomings of the prior art since outgassing eruptions do not materially disturb the sensed temperature. The control system of the present invention is outstandingly adapted to maintaining a thin blanket of batch, such as less than one inch (2.54 centimeters) and preferably within the range of $\frac{3}{8}$ to $\frac{1}{2}$ inch (0.95 to 1.27 centimeters), in a small melter; however, it can be used to maintain the batch at any thickness, provided that the surface temperature of the batch blanket is greater than the surface temperature of the sidewall.

By maintaining the batch at a predetermined thickness, the present invention maintains a constant level of molten glass in the furnace. The level does not change, because the amount of batch provided to the furnace is equal to the amount of batch melted, which under normal operating conditions is equal to the amount of glass withdrawn from the furnace. If the power provided to the furnace is increased or decreased, the change in the rate of melting is detected by the sensing unit, which detects the change in the thickness of the batch blanket and makes the appropriate change in the feed rate. In the preferred embodiment, the present invention employs proportional control to modify the feed rate as a function of the amount of deviation from the desired batch thickness.

Other objectives, advantages and applications of the present invention will be made apparent by the following detailed description of the preferred embodiment of the invention.

BRIEF DESCRIPTION OF THE DRAWINGS

FIG. 1 is a schematic view in longitudinal cross section of an electrically operated glass melting furnace utilizing the present invention.

FIG. 2 is a schematic plan view showing the orientation of the sensor of the present invention in relation to the furnace shown in FIG. 1.

DETAILED DESCRIPTION OF THE PREFERRED EMBODIMENT

Referring to FIGS. 1 and 2, a typical glass melting furnace which utilizes the present invention is indicated generally by numeral 10. Furnace 10 has a bottom wall 12 and sidewalls 13 which have a lower portion 14 that is perpendicular to bottom wall 12 and an upper portion 16 that is slanted towards the center of furnace 10. Furnace 10 contains a body of molten glass 18 which has a blanket of batch 20 floating on its upper surface 24. A platinum screen 22 is positioned within molten glass 18 such that it is parallel to and typically a few inches below upper surface 24. An electric current is passed through screen 22 for heating thereof to a high temperature which, in turn, heats molten glass 18.

In a furnace of this type, it is desirable to maintain blanket of batch 20 as a uniform, relatively thin layer over the entire upper surface 24 of molten glass 18, for example, less than 1 inch (2.54 centimeters) and, preferably, in the range of about ⅜ to ½ inch (0.95 to 1.27 centimeters). A feeder 26 is mounted above furnace 10 for uniformly distributing the batch 27 over blanket of batch 20; feeder 26 may be of any desired configuration, such as the feeder illustrated in either U.S. Pat. No. 3,980,460, or U.S. Pat. No. 3,748,112. Batch 27 is discharged from feeder 26 at a rate that is determined by the speed of motor 28.

An infrared sensor 30 is positioned such that it can remotely sense the radiation that is emitted from blanket or batch 20 and reflected from the inner surface of upper portion 16 of sidewall 13; this reflected radiation is indicative of the average temperature of the surface of blanket of batch 20. Sensor 30 is connected to a controller 32 which compares the temperature detected by sensor 30 with a set point reference temperature indicative of the temperature that corresponds to the desired batch thickness. Controller 32 provides an output control signal that is indicative of the temperature deviation from the desired set point. Obviously, the particular set point temperature will depend upon the type of glass being melted in the furnace and the desired optimal thickness of the blanket of batch. Sensor 30 and controller 32, for example, may consist of a Modline 6000 infrared sensor and controller manufactured by Ircon Corporation of Skokie, Ill.

Controller 32 may provide, for example, a nonisolated control signal of 4 to 20 milliamperes to a signal inverter 34 which provides an isolated DC control signal of, for example, 10 to 0 volts to switch 36. Switch 36 provides the alternative of either automatic or manual control. In the automatic mode, switch 36 provides the output signal from signal inverter 34 to motor drive 38. In the manual mode, switch 36 provides the output signal from manual controller 40 to motor drive 38. Manual controller 40 has a variable output control signal of 0 to 10 volts DC which may be selected by an operator. Preferably, motor drive 38 is an inverter drive that provides a three phase, 0 to 60 hertz, AC signal of 0 to 230 volts to motor 28. Motor 28 is a three phase motor geared to run at half speed at the normal glass pull rate of the furnace. Obviously, other motor and motor drive configurations may be used with the present invention. In addition, the voltage, ampere and frequency ranges referred to hereinabove are served by way of illustration and not limitation.

In normal operation, switch 36 is placed in the manual mode to allow the operator to adjust the feed rate until the desired level of molten glass is obtained. The operator then selects the appropriate set point reference temperature for controller 32 and places switch 36 in the automatic mode. Motor 28 will continue to drive feeder 26 until feeder 26 has spread a blanket of batch 20 on surface 24 of molten glass 18 of the desired thickness. This thickness is determined by sensor 30 detecting the radiation reflected from upper portion 16 of sidewall 13. Motor 28 drives feeder 26 at a rate that is proportional to the difference between the set point reference temperature and the detected temperature. If the detected temperature is equal to the set point reference, temperature motor 28 drives feeder at a rate that is equal to the normal melting rate of furnace 10. Accordingly, the control system of the present invention provides batch material 27 to furnace 10 at a rate that maintains blanket of batch 20 at a predetermined thickness and maintains upper surface 24 of molten glass 18 at a predetermined level.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

I claim:

1. A method of controlling the thickness of a blanket of batch floating on a body of molten glass in a glass melting furnace, said method comprising the steps of: feeding batch to the surface of said blanket of batch material; sensing the radiation reflected from a sidewall of said furnace above said blanket of batch; and controlling the feed rate of said batch in response to the sensed radiation to maintain said blanket of batch at a predetermined thickness.

2. A method as recited in claim 1, wherein said sensing step comprises remotely sensing said reflected radiation.

3. A method as recited in claim 2, wherein the top portion of said sidewall is slanted and said sensing step comprises remotely sensing said reflected radiation from said slanted portion of said sidewall above said blanket of batch.

4. A method as recited in claim 3, wherein said method further comprises the step of generating a signal indicative of the sensed radiation, and said controlling step comprises the steps of comparing said generated signal with a reference signal to generate a control signal and modifying the rate of feed of said batch in response to said control signal.

5. A method as recited in claim 4, wherein said modifying step comprises modifying the feed rate of said batch such that said blanket of batch is maintained at a predetermined thickness of not more than 2.54 centimeters.

6. A method as recited in claim 5, wherein said modifying step comprises modifying the feed rate of said batch such that said blanket of batch is maintained at a thickness within the range of about 0.95 to 1.27 centimeters.

7. A method as recited in claim 4, wherein said modifying step comprises proportionally modifying the rate of feed of said batch in response to said control signal.

8. An apparatus for controlling the thickness of a blanket of batch floating on a body of molten glass in a glass melting furnace having a sidewall and a feeder means for supplying batch to said furnace such that said batch is supplied above said body of molten glass, said apparatus comprising: means for sensing the radiation reflected from said sidewall above said blanket of batch; and means for controlling the batch feed rate of said feeder means in response to the radiation sensed by said sensing means to maintain said blanket of batch at a predetermined thickness.

9. An apparatus as recited in claim 8, wherein the upper portion of said sidewall is slanted and said sensing means comprises means for remotely sensing the radiation reflected from said slanted portion of said sidewall.

10. An apparatus as recited in claim 9, wherein said sensing means comprises means for generating a signal that is indicative of the sensed radiation and said controlling means comprises means for comparing said generated signal with a reference signal to provide a control signal and said feeder means is responsive to said control signal.

11. An apparatus as recited in claim 10, wherein said controlling means maintains said blanket of batch at a predetermined thickness of not more than 2.54 centimeters.

12. An apparatus as recited in claim 11, wherein said controlling means maintains said blanket of batch at a thickness within the range of about 0.95 to 1.27 centimeters.

13. An apparatus as recited in claim 10, wherein said feeder means proportionally modifies the feed rate in response to said control signal.

14. An apparatus for controlling the thickness of a blanket of batch floating on a body of molten glass in a glass melting furnace having a baottom wall and a sidewall that has a bottom portion that is perpendicular to said bottom wall and an upper portion that is slanted and a feed means for supplying batch to the surface of said blanket of batch, said apparatus comprising: an infrared sensor for remotely sensing the radiation reflected from the surface of said upper portion of said sidewall at a predetermined point above the upper surface of said blanket of batch, said infrared sensor being adapted to provide an electrical signal that is indicative of the radiation sensed thereby; and control means connected to said infrared sensor for comparing the signal provided by said infrared sensor with a set point reference signal indicative of the desired amount of radiation which corresponds to the desired thickness of said blanket of batch, said control means being connected to said feed means to proportionally control the rate of feed thereof in response to said comparison.

15. A method of controlling the level of molten glass in a glass melting furnace, said method comprising the steps of: establishing a predetermined level of molten glass in said furnace; feeding batch to the surface of said molten glass to create a blanket of batch on said surface; sensing the radiation reflected from the sidewall of said furnace above said blanket of batch; and controlling the feed rate of said batch in response to the sensed radiation to maintain said molten glass at said predetermined level.

16. A method as recited in claim 15, wherein said sensing step comprises remotely sensing said reflected radiation.

17. A method as recited in claim 16, wherein the top portion of said sidewall is slanted and said sensing step comprises remotely sensing said reflected radiation from said slanted portion of said sidewall above said blanket of batch.

18. A method as recited in claim 17, wherein said method further comprises the step of generating a signal indicative of the sensed radiation, and said controlling step comprises the steps of comparing said generated signal with a reference signal to generate a control signal and modifying the rate of feed of said batch in response to said control signal.

19. A method as recited in claim 18, wherein said modifying step comprises proportionally modifying the rate of feed of said batch in response to said control signal.

* * * * *